J. M. AUBERY.
DIFFERENTIAL AXLE.
APPLICATION FILED AUG. 13, 1917.
1,344,933.
Patented June 29, 1920.
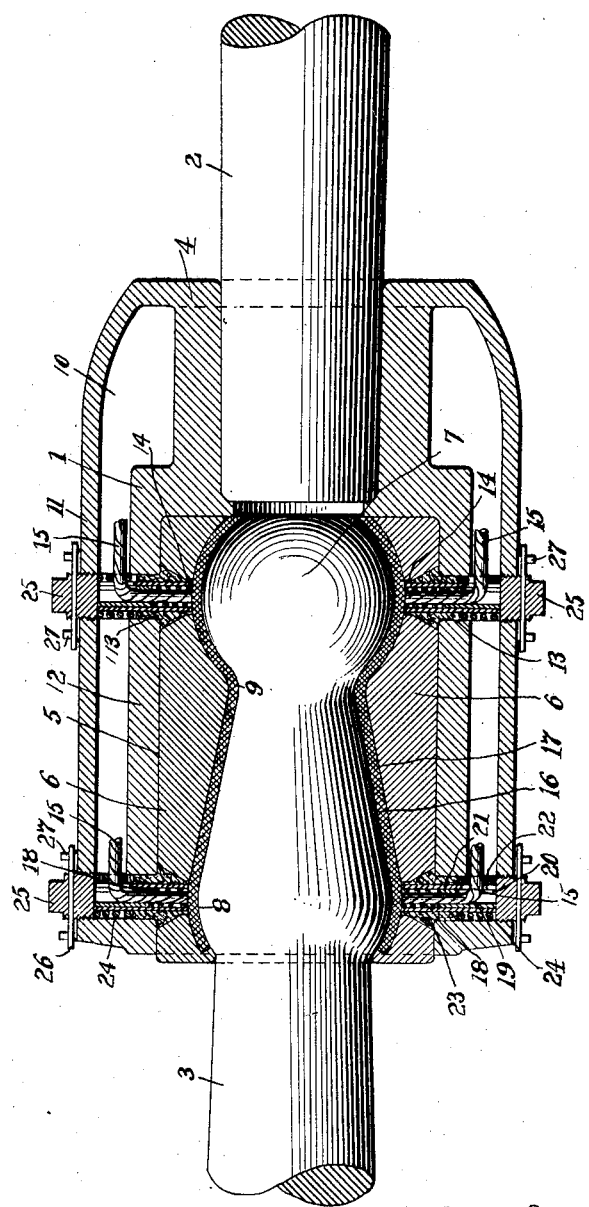
INVENTOR
James M. Aubery,
BY
Prindle Wright & Small.
ATTORNEY

UNITED STATES PATENT OFFICE.

JAMES M. AUBERY, OF LOS ANGELES, CALIFORNIA, ASSIGNOR TO PRIESTLY COUPLER COMPANY, A CORPORATION OF NEW YORK.

DIFFERENTIAL AXLE.

1,344,933.      Specification of Letters Patent.      Patented June 29, 1920.

Application filed August 13, 1917. Serial No. 185,872.

*To all whom it may concern:*

Be it known that I, JAMES M. AUBERY, of Los Angeles, in the county of Los Angeles, and in the State of California, have invented a certain new and useful Improvement in Differential Axles, and do hereby declare that the following is a full, clear, and exact description thereof.

My invention has for an object to produce a differential axle which, although capable of general application, shall be especially adapted for use as a railway car axle.

Another object of my invention is to provide an axle of such strength and so proportioned as to resist adequately the strains incident to its use.

Another object of my invention is to provide sufficient bearing surface to absorb properly the friction between the elements of the bearing, particularly at the points at which the pressure is greatest.

Another object of my invention is to effect proper lubrication of the bearing and yet avoid excessive flow or leakage of the lubricant.

Other objects and advantages of the invention will be in part obvious and in part specifically mentioned hereinafter.

The single figure of the drawing is a longitudinal section of an axle designed according to my invention, which axle is to be considered merely as illustrative of the principle thereof.

Referring to the drawing, an axle casing 1 is employed, which casing may be of any suitable shape to inclose the alined ends of shafts 2 and 3. As shown, the casing 1 is of general cylindrical form, and has at one end a hub 4 within which shaft 2 is fixed in any desired way. In the illustrated embodiment, shaft 2 is pressed within hub 4.

The axle casing 1 is also provided with a longitudinal recess 5 within which the bearing for shaft 3 is located. As shown in the drawing, this bearing comprises a pair of semi-cylindrical bearing blocks 6, which may be fixed within recess 5 in the same way as described in connection with shaft 2. The end of the shaft 3 has a spherically curved bearing surface 7 which engages a bearing surface of similar shape upon blocks 6, so as to provide a large contact area between surface 7 of the shaft 3 and the corresponding surfaces of the bearing blocks 6.

That portion of the shaft 3 which is adjacent the outer end of bearing blocks 6 is enlarged, and is also spherically curved, as shown at 8. Between the surfaces 7 and 8 the shaft 3 may taper down to a neck portion 9, if desired.

To lubricate the bearing surface an oil reservoir 10 is provided, which reservoir may conveniently be contained between an outer wall 11 and an inner wall 12 of the casing 1. The inner wall 12 is provided with any desired number of holes 13 which are alined with holes 14 in the bearing blocks 6. Oil conducting members, such as wicks 15, lead from oil reservoir 10 through holes 13 and 14, and are fastened at one end to oil distributing members 16, which are received in grooves 17 within the bearing blocks. These oil distributing members may be made of woolen plush, or similar material. A spring 18 surrounds each of the wicks 15, and a tube 19 abuts each one of such springs, such tube 19 being provided with a slot 20 to permit wick 15 to be led out through the side thereof. A second tube 21 incloses tube 19 and spring 18 and has a slot 22 for a similar purpose. Suitable packing material 23 fills the space in holes 13 and 14, outside of tube 21. A spring 24 engages the packing 23 to hold it in place. A threaded plug 25 engages both spring 24 and tube 19 whereby the compression of springs 18 and 24 may be adjusted. If desired, the plug 25 may be held in adjusted position by cotter pin 26, engaging between lugs 27 on the casing 1. In assembling the bearing, wicks 15 are sewed to strips 16 and the wicks coiled within enlargements 28 of the holes 14, so that such wicks do not project beyond the surface of the bearing blocks 6. Shaft 3 is then placed between the bearing blocks, and such blocks pressed tightly within recess 5. Threaded plugs 25 are then removed, and the wicks 15 pulled out. Spring 18, tube 19, and tube 21 are then placed successively into position on the wick, and the latter threaded through slots 20 and 22 of the tubes into oil reservoir 10. The packing material 23 is then inserted to fill up holes 13 and 14, and spring 24 placed in position. Plug 25 is then screwed into place to put the desired amount of pressure on oil distributing strip 16 and packing material 23. Cotter pin 26 is then inserted through plug 25 and between the lugs 27 to hold such plug in adjusted position.

In using the axle upon railway cars, the load will be upon the ends of shafts 2 and 3, with the result that surface 8 of the bearing acts as a fulcrum, and shaft 3 tends to tilt its end bearing surface 7 with respect to the corresponding surface of blocks 6. This pressure upon surface 7 is widely distributed owing to the large area of the surface, and undue heating of the bearing obviated. Also the spherical surface 7 does not tend to present an edge to the corresponding surface of blocks 6, when the shaft 3 moves about point 8 as a fulcrum, so that the whole surface 7 is effective even where the shaft 3 is under great strain. This again decreases the tendency of the bearing to heat. Bearing surface 8, being spherical, also permits that portion of the bearing to act as a fulcrum for shaft 3, without decreasing the area of the bearing surface, or changing the angle of surface 8 with respect to the corresponding surface of blocks 6, or putting undue strains thereupon. Again, the bending stress upon shaft 3 is the greatest at its spherical bearing portion 8, and the enlarged cross section of the shaft at that point lessens the liability of failure due to bending.

The oil reservoir 10 may be conveniently made of such capacity as to carry a sufficient quantity of oil to last during the life of the bearing, so that the bearing does not require attention during use. The wicks 15 and strips 16 conduct the oil effectively to the desired points upon the bearing surface, and still prevent an undue flow of oil to the bearing surface. These members in combination with packing 23 also prevent leakage of oil from the reservoir.

While I have described a specific form of my invention, it is obvious that many changes may be made which will still be within its spirit.

I claim:

1. A differential railway axle comprising two alined shafts subjected to relatively high bending strains, a bearing member fixedly secured to the end of one of said shafts and inclosing the adjacent end of the remaining shaft, said member serving to hold said shafts in alinement, whereby said latter shaft tends to move upwardly at its inner end and downwardly at the inclosing edge of said bearing member, said shaft and bearing member having curved engaging bearing surfaces at said points of pressure.

2. A differential railway axle comprising a shaft end subjected to relatively high bending strains, a bearing member inclosing said shaft end and retaining the same in proper position, whereby the shaft tends to move upwardly at such end, and downwardly at the inclosing edge of said bearing member, said shaft and bearing member having curved engaging bearing surfaces at said points of pressure.

3. A differential railway axle comprising two alined shafts subjected to relatively high bending strains, a bearing member fixedly secured to the end of one of said shafts and inclosing the adjacent end of the remaining shaft, said member serving to hold said shafts in alinement, whereby said latter shaft tends to move upwardly at its inner end and downwardly at the inclosing edge of said bearing member, said shaft having spherically curved bearing surfaces of enlarged cross-section at said points of pressure.

4. A differential railway axle comprising a shaft end subjected to relatively high bending strains, a bearing member inclosing said shaft end, whereby the shaft tends to move upwardly at such end, and downwardly at the inclosing edge of said bearing member, said shaft having spherically curved bearing surfaces of enlarged cross-section at said points of pressure.

5. A differential railway axle comprising two alined shafts subjected to relatively high bending strains, a bearing casing fixedly secured to the end of one of said shafts and having a recess adapted to receive the adjacent end of the remaining shaft, a plurality of bearing blocks within said recess engaging said latter shaft, said casing and bearing blocks serving to hold said shafts in alinement, whereby said latter shaft tends to move upwardly at its inner end and downwardly at the outer edge of said bearing blocks, said shaft and bearing blocks having curved engaging bearing surfaces at said points of pressure.

6. A differential railway axle comprising two alined shafts subjected to relatively high bending strains, a bearing casing fixedly secured to the end of one of said shafts and having a recess adapted to receive the adjacent end of the remaining shaft, a plurality of bearing blocks within said recess engaging said latter shaft, said casing and bearing blocks serving to hold said shafts in alinement, whereby said latter shaft tends to move upwardly at its inner end and downwardly at the outer edge of said bearing blocks, said shaft having spherically curved bearing surfaces of enlarged cross-section at said points of pressure.

In testimony that I claim the foregoing I have hereunto set my hand.

JAMES M. AUBERY.

Witnesses:
R. S. TAYLOR,
GERTRUDE LEVIN.